United States Patent
Defuans et al.

(10) Patent No.: US 7,221,360 B2
(45) Date of Patent: May 22, 2007

(54) COMPUTER STYLUS AND COMPUTER ADAPTED TO BE USED THEREWITH

(75) Inventors: Christine Defuans, Meylan (FR); Jean-Michel Berge, Saint Nazaire les Eymes (FR); Gilles Grattard, Gieres (FR)

(73) Assignee: France Telecom, Paris (FR)

( * ) Notice: Subject to any disclaimer, the term of this patent is extended or adjusted under 35 U.S.C. 154(b) by 306 days.

(21) Appl. No.: 10/495,588

(22) PCT Filed: Nov. 25, 2002

(86) PCT No.: PCT/FR02/03671

§ 371 (c)(1),
(2), (4) Date: May 12, 2004

(87) PCT Pub. No.: WO2003/042910

PCT Pub. Date: May 22, 2005

(65) Prior Publication Data

US 2004/0252110 A1 Dec. 16, 2004

(30) Foreign Application Priority Data

Nov. 13, 2001 (FR) .................................. 01 14750

(51) Int. Cl.
G09G 5/08 (2006.01)
G06F 3/033 (2006.01)
(52) U.S. Cl. ....................... 345/179; 345/156; 345/157; 178/19.01; 178/19.04
(58) Field of Classification Search ........ 345/156–184; 178/18.01–18.11, 19.01–19.07; 455/556.2
See application file for complete search history.

(56) References Cited

U.S. PATENT DOCUMENTS

| 5,214,428 | A | * | 5/1993 | Allen .......................... 345/179 |
| 5,615,083 | A | | 3/1997 | Burnett |
| 5,721,566 | A | * | 2/1998 | Rosenberg et al. ......... 345/161 |
| 5,974,334 | A | * | 10/1999 | Jones, Jr. .................. 455/556.2 |
| 6,271,828 | B1 | | 8/2001 | Gillespie et al. |
| 6,806,865 | B2 | * | 10/2004 | Oueslati et al. ............. 345/161 |
| 2002/0105503 | A1 | * | 8/2002 | Oueslati et al. ............. 345/173 |
| 2003/0076302 | A1 | * | 4/2003 | Langstraat ................. 345/179 |

FOREIGN PATENT DOCUMENTS

GB 2 359 872 A 9/2001

* cited by examiner

*Primary Examiner*—Bipin Shalwala
*Assistant Examiner*—David L. Lewis
(74) *Attorney, Agent, or Firm*—Cohen Pontani Lieberman & Pavane LLP

(57) ABSTRACT

A stylus for a computer and a computer adapted to be used with the stylus. The computer comprises a housing (3) that carries a screen (4) and control means (6) adapted to be manipulated by a user to generate movements of a mobile object on the screen in at least one direction. The control means comprises a fixed part (10) and a mobile part (7) fastened to the housing and cooperating with each other, the fixed part being electrically connected to the housing. The mobile part comprises movement transducer means (9a–9d) which are adapted, in response to movement of the mobile part, to transmit to the fixed part information in the form of electrical signals relating to movement of the mobile object. One end of the stylus comprises fixing means adapted to cooperate with complementary fixing means (13) fastened to the mobile part to fasten the stylus to the movement control means to form a control that may be manipulated by the user.

16 Claims, 7 Drawing Sheets

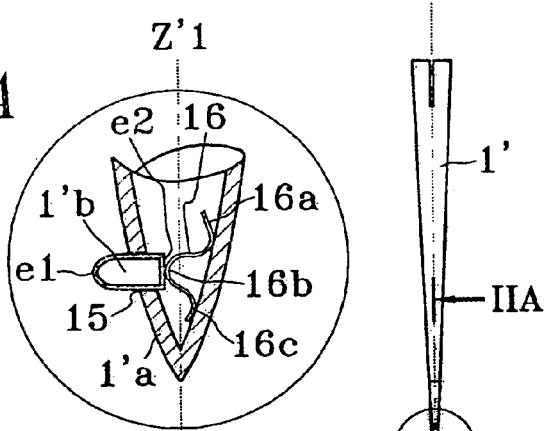
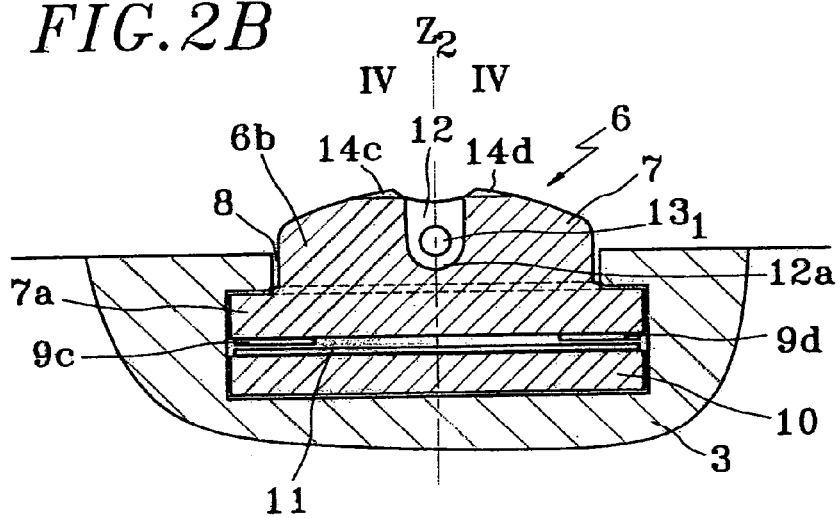
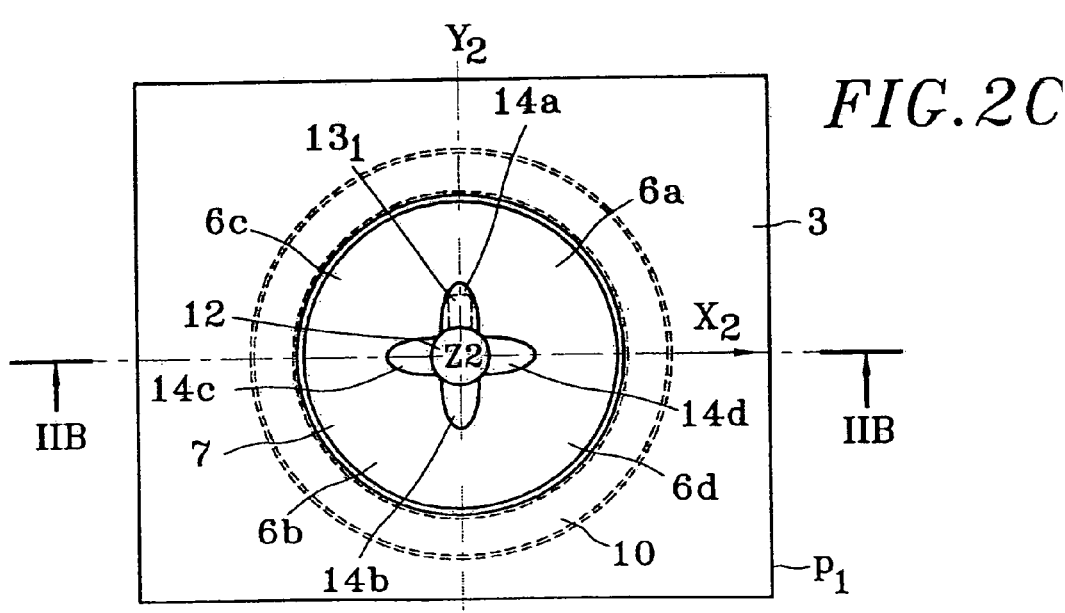

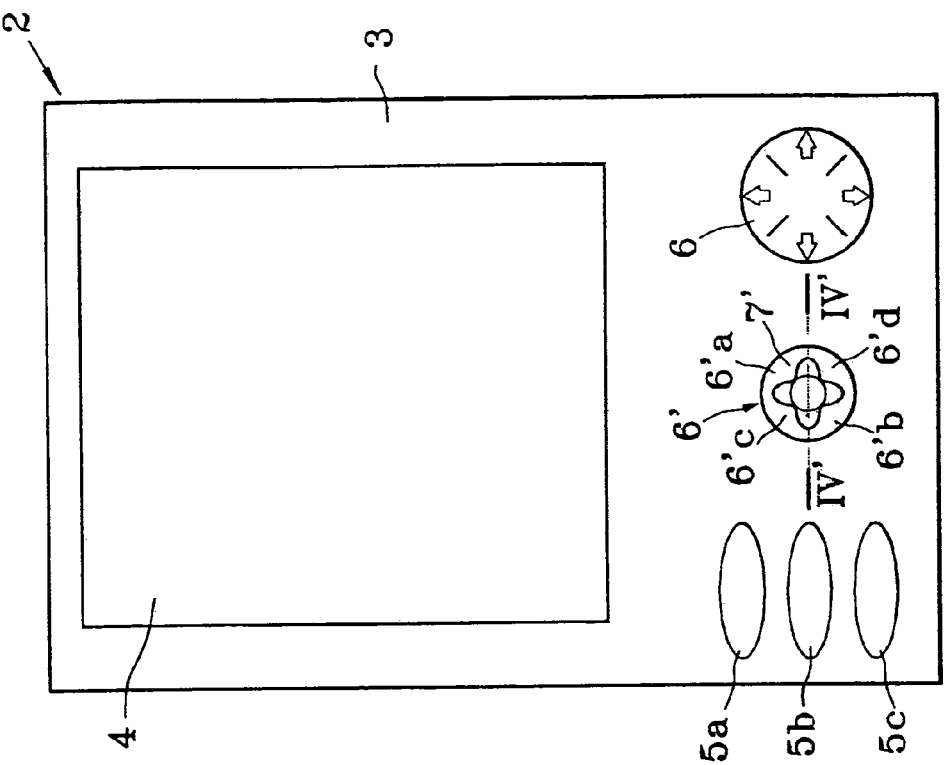
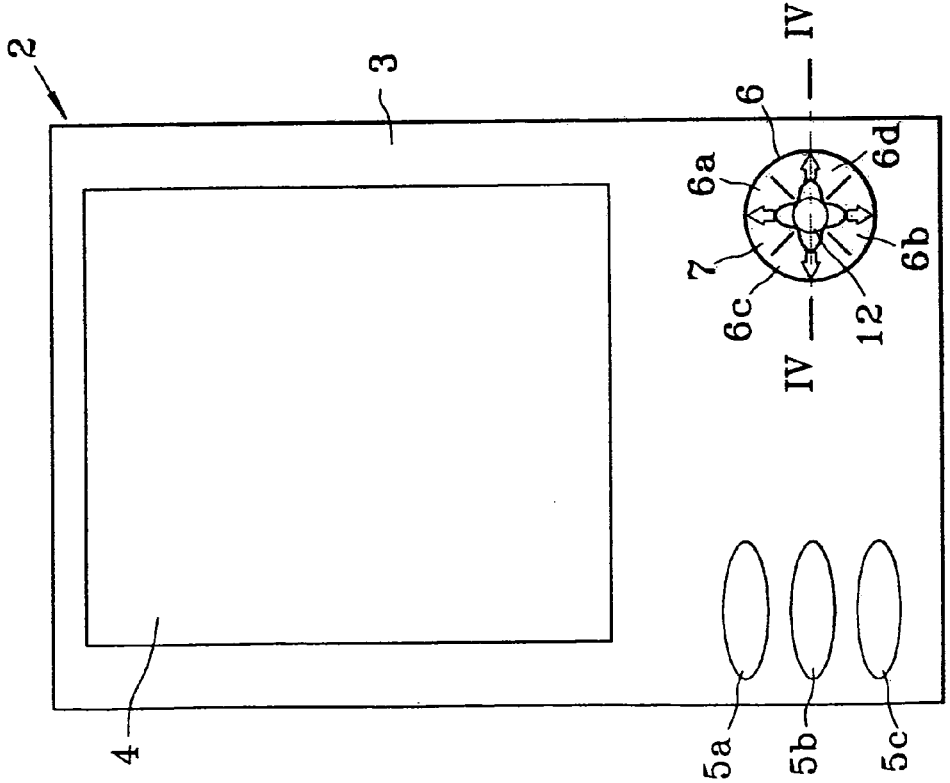

COMPUTER STYLUS AND COMPUTER ADAPTED TO BE USED THEREWITH

RELATED APPLICATIONS

This is a U.S. national stage of International Application No. PCT/FR02/03671, filed on 25 Oct. 2002.

FIELD OF THE INVENTION

The present invention relates to a computer stylus.

The invention relates more particularly to a stylus for a computer comprising a housing that carries a screen and control means adapted to be manipulated by a user to generate movements of a mobile object on the screen in at least one direction, said control means comprising a fixed part and a mobile part fastened to the housing and cooperating with each other, said fixed part being electrically connected to the housing and said mobile part comprising movement transducer means which are adapted, in response to movement of the mobile part, to transmit to the fixed part information in the form of electrical signals relating to movement of said mobile object.

A stylus of the type in question is adapted in particular to be used with a pocket computer such as a personal digital assistant (PDA), for example. This kind of stylus has one end adapted to be moved over the touch-sensitive screen of the PDA, generally to enter text on the screen or to browse interactively through a menu displayed on the screen.

The pocket computer may be provided with means for controlling movements of a mobile object (person, animal, etc.) on the screen, usually in at least four directions (right, left, up, down), said control means generally taking the form of a cross with four branches. This kind of control means is used in particular when the pocket computer contains computer game software. The movement of the object in each direction is obtained by depressing one of the branches of the cross using the index finger or another finger. The pressure applied depresses the spring-loaded branch and closes a switch, which causes the mobile object to move on the screen in the required direction.

BACKGROUND OF THE INVENTION

In some types of pocket computer, the above control means may consist of the stylus itself, which the user slides over the screen in various directions to control movement of a mobile object on the screen.

However, this use of the stylus is not very ergonomic, since the user must both impose the direction that he wishes to impart to the mobile object on the screen and hold the stylus in contact with the screen. Given that pocket computers are small, they offer very little support for the hand holding the stylus, which makes the position of that hand relative to the pocket computer particularly uncomfortable, especially if the user is moving around (for example using his pocket computer in a moving vehicle).

SUMMARY OF THE INVENTION

One particular object of an embodiment of the present invention is to remedy the above-mentioned drawbacks by providing a stylus that has an end that comprises fixing means adapted to cooperate with complementary fixing means on the mobile part to fasten the stylus to the movement control means to form a control that may be manipulated by the user.

This guarantees continuous interactivity, since the user no longer has to apply a force to hold the stylus in contact with the screen. Furthermore, the position of the user's hand relative to the housing of the computer is made much more comfortable.

Preferred embodiments of the stylus of the invention use one or both of the following features:

the fixing means comprise a pin attached to the end of the stylus, the fixing means comprise a notch formed in said end.

An embodiment of the invention also provides a computer adapted to be used with a stylus of the above type.

Preferred embodiments of the computer of the invention use one or more of the following features:

Preferred embodiments of the computer of the invention use one or both of the following features:

the complementary fixing means comprise a notch opening into a cavity in the mobile part and adapted to receive the end of the stylus;

the complementary fixing means comprise a fastening member for fastening the stylus into and releasing it from a cavity in the mobile part adapted to receive the end of the stylus, said fastening member being disposed in a housing that is defined firstly by a recess in the mobile part that opens into said cavity and secondly by a cavity in the housing, said cavity having a first portion that opens into the recess and a second portion that opens to the outside of the housing;

the control means comprise a multidirectional cross;

the control means comprise an anchor member.

BRIEF DESCRIPTION OF THE DRAWINGS

FIG. 2A is a front view of a second embodiment of the stylus according to the invention, in which the end of the stylus is shown to a larger scale and in section taken along the line IIA—IIA, FIG. 2B is a view in section taken along the line IV—IV in FIG. 4A of the control means adapted to cooperate with the stylus from FIG. 2A, FIG. 2C is a plan view of the control means from FIG. 2B, FIG. 4A is a front view of a computer comprising a screen over which the stylus shown in FIGS. 1A, 2A and 3A is adapted to be moved, and FIG. 4B shows a variant of the computer represented in FIG. 4A.

DETAILED DESCRIPTION OF THE DRAWINGS

A first embodiment of the stylus of the invention and the associated movement control means are described next with reference to FIGS. 1A, 1B, 1C and 4A.

Figure 1A:
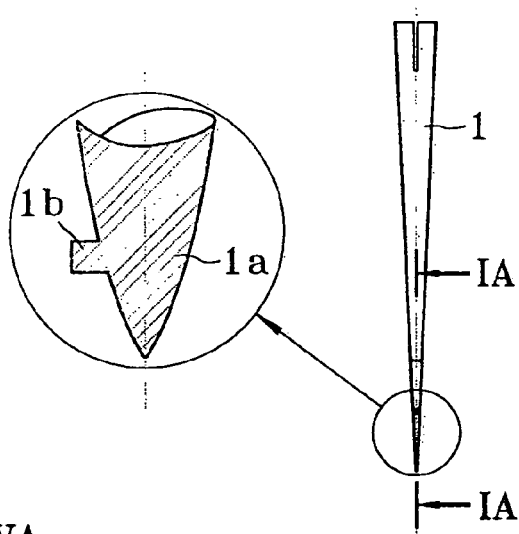
FIG. 1A is a front view of a first embodiment of the stylus, in which the end of the stylus is shown to a larger scale and in section taken along the line IA—IA.

As can be seen in FIG. 1A, the stylus 1 has an end 1a shown to a larger scale and in section inside a circle in FIG. 1A. The end 1a is tapered so that, in a manner that is known in the art, it may be used to enter text on the screen as accurately as possible or to browse interactively through a menu displayed on the screen. In the example shown, the end 1a is solid and is provided with a pin 1b molded in one piece with it. In the example shown, the pin 1b is substantially rectangular.

A computer 2 that comprises a housing 3 comprising a screen 4 over which the end 1a of the stylus is adapted to move is described next with reference to FIG. 4A.

In the example shown, the computer 2 is a PDA with a touch-sensitive screen 4.

Alternatively, the computer 2 may be a computer comprising a screen that is not touch-sensitive, for example a notebook computer, a games console, etc.

The housing 3 further comprises standard function keys, for example three keys 5a, 5b, 5c. For example, the key 5a is an on/off key, the key 5b is an address book key, and the key 5c is a note pad key.

The housing 3 also comprises a cross 6 with four branches 6a, 6b, 6c, 6d, said cross being used, in a manner that is known in the art, to command movement of a mobile object (not shown) on the screen 4 in at least four directions (up, down, left, right).

Figure 1B:
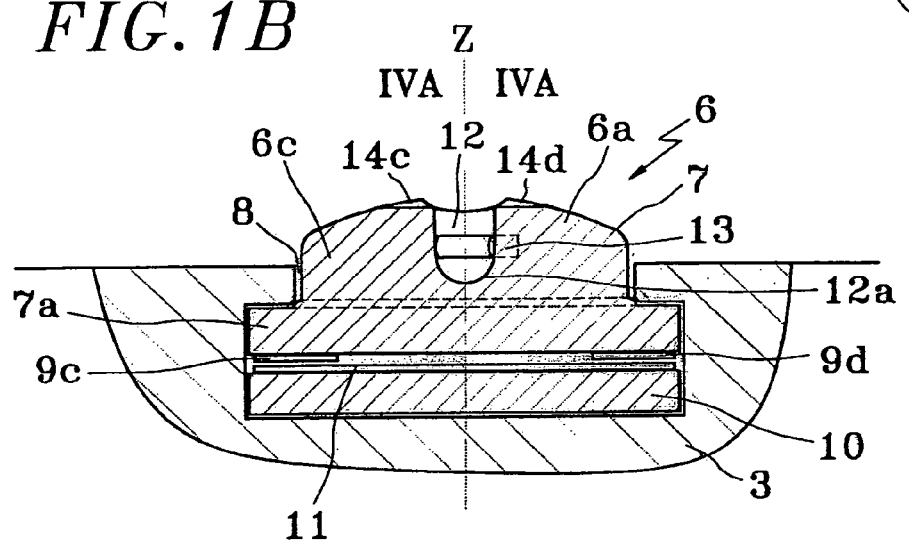
FIG. 1B is a view in section taken along the line IV—IV in FIG. 4A of control means adapted to cooperate with the stylus from FIG. 1A.
Figure 1C:
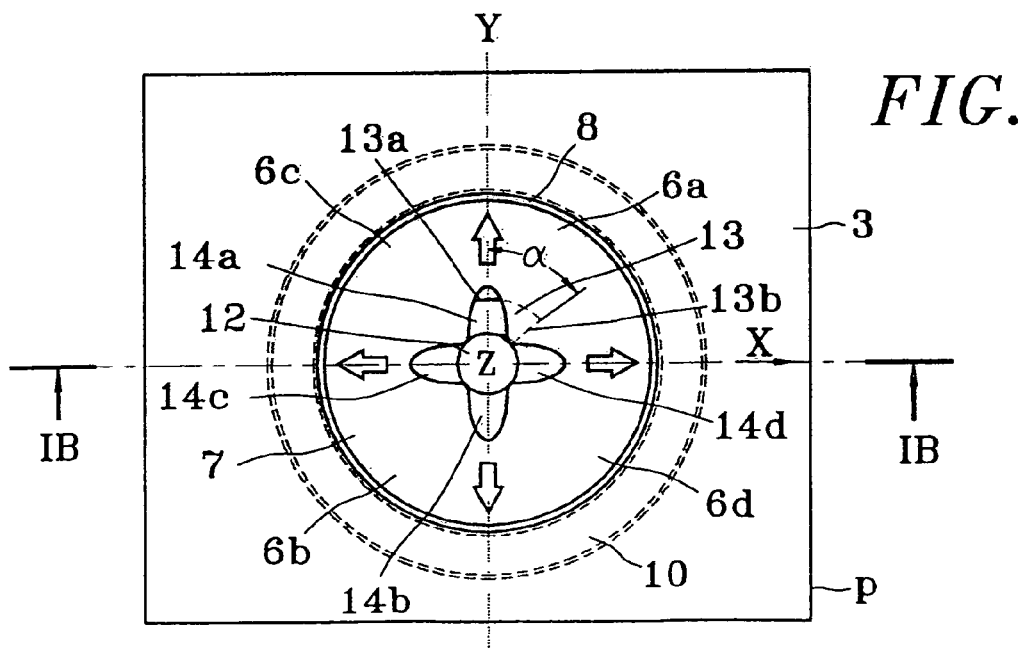
FIG. 1C is a plan view of the control means from FIG. 1B.

Referring more particularly to FIGS. 1B and 1C, the cross 6 comprises a mobile part 7 accommodated with a small clearance inside a cavity 8 of the housing 3 so that said branches 6a to 6d of the cross 6 project out of the housing 3 so that they can be depressed by the user. Said mobile part 7 is conformed so that, once mounted in the housing 3, it is circumferentially symmetrical about a vertical axis Z. Said mobile part 7 further comprises a base 7a under which are fixed a plurality of movement transducers, for example four transducers 9a, 9b, 9c, 9d, of which only the transducers 9c and 9d can be seen in FIG. 1B.

As can also be seen in FIG. 1B, the cross 6 has a fixed part 10 housed in the cavity 8 of the housing 3 immediately below the base 7a of the mobile part 7 of the cross 6. Said fixed part carries an electronic circuit 11 on its face that faces toward the movement transducers 9a to 9d. Accordingly, in a manner that is known in the art, when the user depresses one of the branches 6a to 6d of the cross 6, for example the branch 6c, the mobile part 7 is inclined downward in the anti clockwise direction, the transducer 9c converting this movement into electrical signals that it sends immediately to the electronic circuit 11.

Referring to FIGS. 1B and 1C, the mobile part 7 of the cross 6 has a cavity 12 in its central portion adapted to receive the end 1a of the stylus 1. In the example shown, the cavity 12 is a circular cylinder concentric with the axis Z and has a substantially rounded bottom 12a.

A notch 13 in the mobile part 7 of the cross 6 adapted to receive the pin 1b at the end 1a of the stylus 1 opens into the lower portion of the cavity 12. As may be seen in FIG. 1C, said notch subtends an angle of approximately 45° in a plane P perpendicular to the axis Z between a horizontal axis X contained in the plane P and a horizontal axis Y also contained in the plane P and perpendicular to the axis Y.

The stylus 1 is fastened to the cross 6 by pressing the end 1a of the stylus 1 into the cavity 12 until it abuts against the bottom 12a of the cavity 12, with the end 1a oriented in the cavity 12 so that the pin lodges in the notch 13, against a first end 13a thereof.

The stylus 1 is then rotated about the axis Z in the clockwise direction so that the pin 1b moves circumferentially in the notch 13 until it abuts against a second end 13b thereof. This immobilizes the stylus 1 relative to the mobile part 7 of the cross 6. Consequently, it may be manipulated in the manner of a joys tick. To this end, the end of the cavity 12 that is open to the outside is provided with four notches 14a, 14b, 14c and 14d adapted to form abutments against which the stylus 1 is adapted to abut when it is moved upward, downward, to the right and to the left, respectively.

To release the stylus 1 from the cross 6, it is sufficient to reverse the fastening maneuver. In other words, the stylus 1 is rotated anti clockwise so that the pin 1b moves circumferentially in the notch 13 until it abuts against the first end 13a of the notch 13. The stylus 1 may then be removed.

In a variant of the computer shown in FIG. 4B, the stylus 1 is not fastened to the multidirectional cross 6, but to an anchor member 6' disposed in the housing 3. In this case, the multidirectional cross 6 is then of an entirely conventional type, i.e. It has no cavity 12.

Figure 1D:
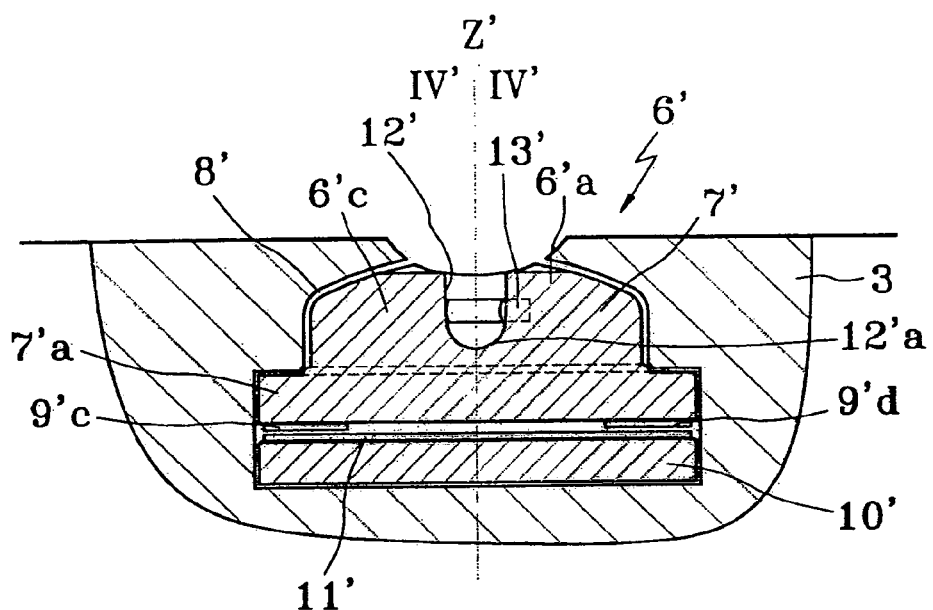
FIG. 1D is a view in section taken along the line IV'—IV' in FIG. 4B of a variant of the first embodiment of the control means.
Figure 1E:
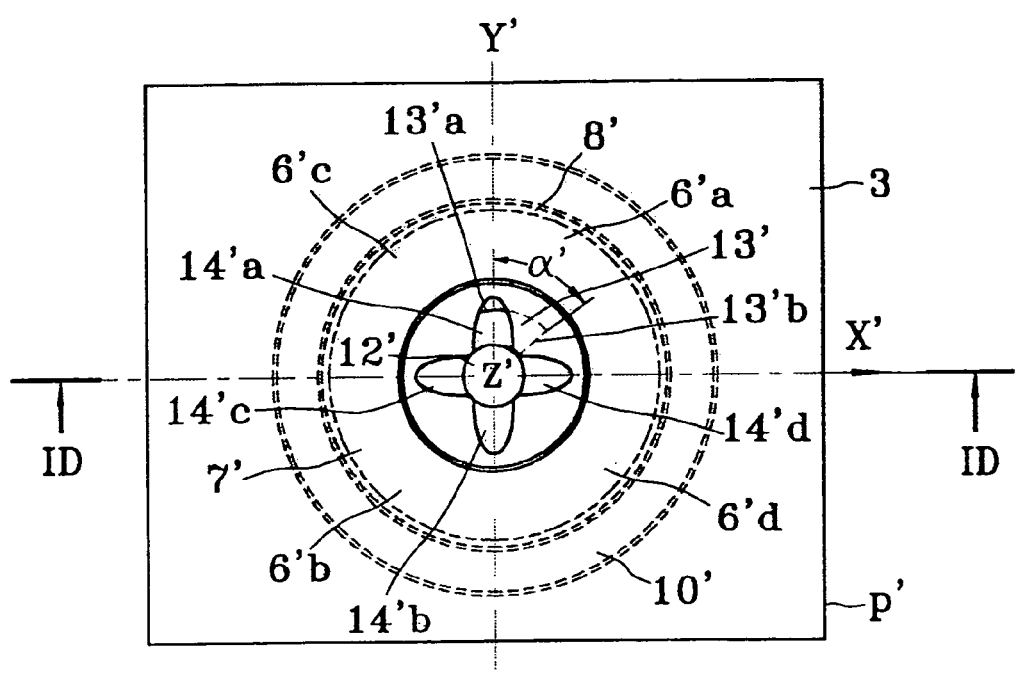
FIG. 1E is a plan view of the FIG. 1D variant of the control means.

Referring more particularly to FIGS. 1D and 1E, the member 6' has, in a similar manner to the cross 6, a mobile part 7' accommodated completely with a small clearance inside a cavity 8' in the housing 3. Said mobile part 7' is conformed so that once mounted in the housing 3 it is circumferentially symmetrical about a vertical axis Z'. Said mobile part 7' further comprises a base 7'a under which are fixed four movement transducers 9'a, 9'b, 9'c, 9'd, of which only the transducers 9'c and 9'd may be seen in FIG. 1D.

As may be also seen in FIG. 1D, the anchor member 6' has a fixed part 10' that is accommodated in the cavity 8' in the housing 3 immediately below the base 7'a of the mobile part 7' of the anchor member 6'. Said fixed part carries an electronic circuit 11' on its face that faces toward the movement transducers 9'a to 9'd. In a similar manner to the cross 6, the mobile part 7' is adapted to be moved relative to the fixed part 10' so that when pressure is applied to one of the regions of the anchor member 6' situated above a movement transducers, for example the region 6'c, the mobile part 7' is inclined downward in the anti clockwise direction, the transducer 9'c converting this movement into electrical signals that it sends immediately to the electronic circuit 11'.

Referring to FIGS. 1D and 1E, the mobile part 7' of the member 6' has in its central portion a cavity 12' adapted to receive the end 1a of the stylus 1. In the example shown, the cavity 12' is a circular cylinder concentric with the axis Z' and has a substantially rounded bottom 12'a.

A notch 13' in the mobile part 7' of the anchor member 6' adapted to receive the pin 1b at the end 1a of the stylus 1 opens into the lower portion of the cavity 12'. As may be seen in FIG. 1E, said notch subtends an angle of approximately 45° in a plane P' perpendicular to the axis Z', between a horizontal axis X' contained in the plane P' and a horizontal axis Y' also contained in the plane P' and perpendicular to the axis Y'.

The stylus is fastened and released in the same way as in the first embodiment represented in FIGS. 1B and 1C.

Once the stylus 1 is fastened to the member 6', it may be manipulated in the manner of a joystick. To this end, the end of the cavity 12' that is open to the outside is provided with four notches 14'a, 14'b, 14'c and 14'd adapted to form abutments against which the stylus 1 is adapted to abut when it is moved upward, downward, to the right and to the left, respectively.

A second embodiment of the stylus of the invention and the associated movement control means are described next with reference to FIGS. 2A, 2B, 2C and 4A.

As may be seen in FIG. 2A, the stylus 1' has an end 1'a shown to a larger scale and in section inside a circle in FIG. 2A. The end 1'a is tapered so that, in a manner that is known in the art, it may be used to enter text on the screen as accurately as possible or to browse interactively through a menu displayed on the screen.

An end 1'a of the kind shown is hollow and circumferentially symmetrical about an axis, for example the vertical axis Z'1. The end 1'a has a wall 1'c with a hole 15 through it into which is inserted a tubular member 1'b having a rounded first end e1 and a straight second end e2; said member 1'b is positioned in the hole 15 so that it is perpendicular to the axis Z'1 with its first end oriented toward the outside of the wall 15 and its second end e2 oriented toward the inside of said wall.

As may also be seen in FIG. 2A, the member 1'b is spring loaded by means of a leaf spring 16, for example, which has first and second free ends 16a and 16b that bear on the inside face of the wall 15 and are adapted to slide in opposite directions in the event of deformation of the leaf spring 16. As explained in more detail in the remainder of the description, the member 1'b is thus adapted to form a retractable pin.

In the rest position, represented in FIG. 2A, the leaf spring 16 is deformed elastically so that an intermediate portion 16c thereof bears against the end e2 of the member 1'b and the end e1 of the latter projects out of the end 1'a of the stylus 1'.

Referring to FIGS. 2B and 2C, the mobile part 7 of the cross 6 is similar to that represented in FIGS. 1B and 1C, except that instead of the latter's notch 13 there is a notch $13_1$ whose shape substantially corresponds to that of the pin 1'b at the end 1'a of the stylus 1', said notch being formed in the mobile part 7 of the cross 6 so that it opens into the lower portion of the cavity 12. As may be seen in FIG. 2C, the notch $13_1$ extends along an axis Y2 contained in a plane $P_1$ of the housing 3 and perpendicular to an axis Z2 along which extends the cavity 12 of the mobile part 7.

The stylus 1' is fastened to the cross 6 by pressing the end 1'a of the stylus 1' into the cavity 12 with the end 1'a oriented in the cavity 12 so that the pin 1'b lines up with the notch $13_1$. This causes the pin 1'b to be pushed inside the end 1'a of the stylus 1' by the wall of the cavity 12, which flattens out the leaf spring 16. When the end e1 of the pin 1'b arrives in front of the notch $13_1$, the leaf spring 16 resumes its rest position, and the pin 1'b is pushed into the notch $13_1$ by the elastic deformation of the leaf spring 16. This immobilizes the stylus 1' relative to the mobile part 7 of the cross 6. Consequently, it may be manipulated in the manner of a joystick. To this end, as in the example represented in FIGS. 1B and 1C, the end of the cavity 12 that opens toward the outside is provided with four notches 14a, 14b, 14c and 14d.

To release the stylus 1' from the cross 6 it is sufficient to pull it firmly upwards, which disengages the pin 1'b from the notch $13_1$. The stylus 1' may then be removed.

Alternatively, a pushbutton could be elastically connected to the end e1 of the pin 1'b so that the trapping of the pin 1'b in the notch $13_1$ raises the pushbutton, the pin 1'b being disengaged from the notch $13_1$ simply by depressing the pushbutton. A button of this kind could be disposed on the housing 3, for example, or on the stylus 1', like the pushbutton of a retractable ball-point pen.

In a variant of the computer shown in FIG. 4B, the stylus 1' is not fastened to the multidirectional cross 6 but to the anchor member 6'.

Figure 2D:
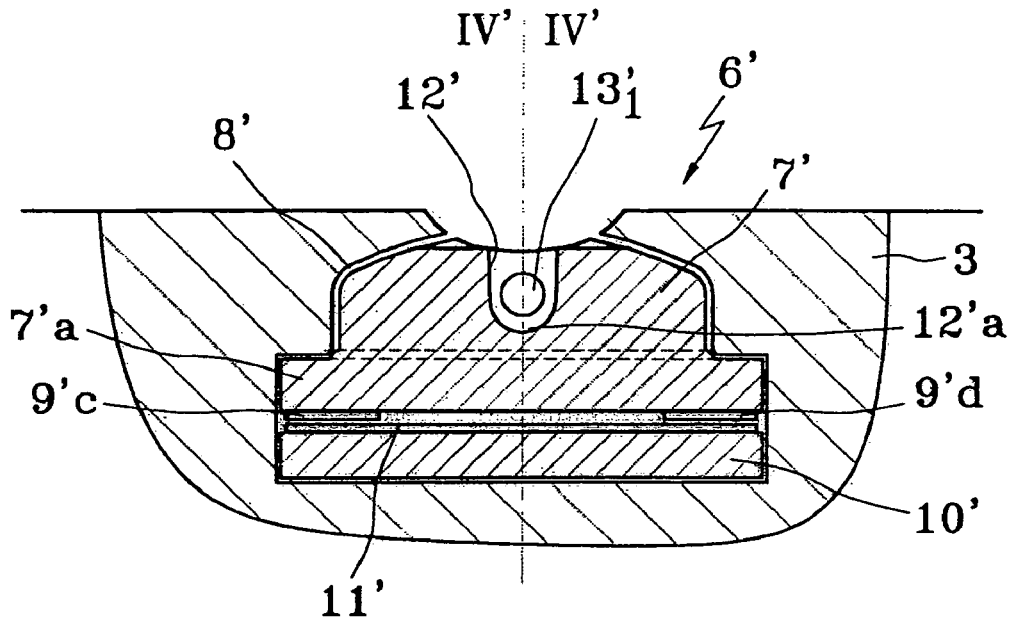
FIG. 2D is a view in section taken along the line IV'—IV' in FIG. 4B of a variant of the second embodiment of the control means.
Figure 2E:
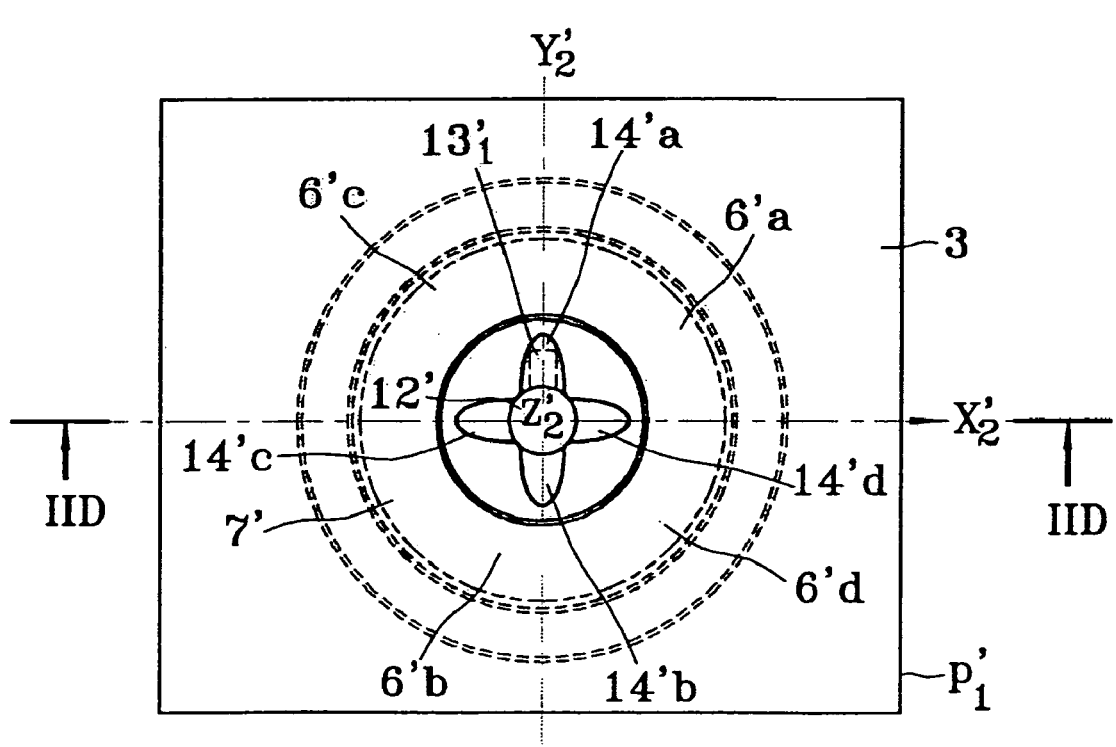
FIG. 2E is a plan view of the FIG. 2D variant of the control means.

Referring more particularly to FIGS. 2D and 2E, the member 6' differs from that represented in FIGS. 1D and 1E in that, instead of the latter's notch 13', it has a notch $13'_1$ identical in all respects to the notch $13_1$ of the mobile part of the cross 6. As may be seen in FIG. 2C, the notch $13'_1$ extends along an axis Y'2 contained in a plane $P'_1$ of the housing 3 and perpendicular to an axis Z'2 along which the cavity 12' extends.

The stylus 1' is fastened and released in the same manner as in the second embodiment represented in FIGS. 2B and 2C.

A third embodiment of the stylus of the invention and the associated movement control means are described next with reference to FIGS. 3A, 3B, 3C and 4A.

Figure 3A:
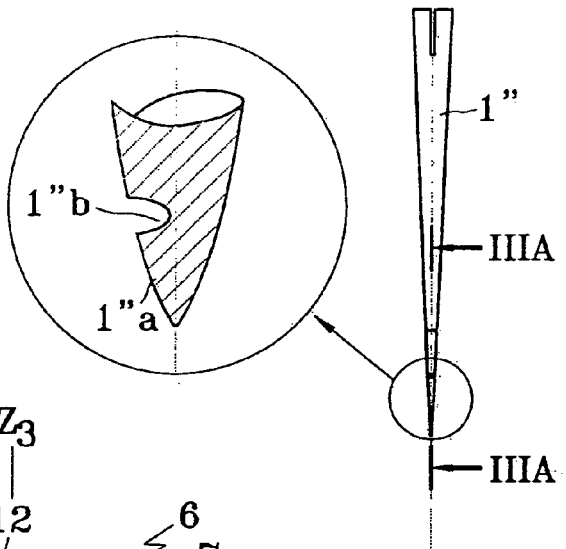
FIG. 3A is a front view of a third embodiment of the stylus, in which the end of the stylus is shown to a larger scale and in section taken along the line III—III.

As may be seen in FIG. 3A, the stylus 1" has an end 1"a, shown to a larger scale and in section inside a circle in FIG. 3A. The end 1"a is tapered so that, in a manner that is known in itself, it may be used to enter text on the screen as accurately as possible or to browse interactively through a menu displayed on the screen. In the example shown, the end 1"a is solid and includes a substantially rounded notch 1"b.

Figure 3B:
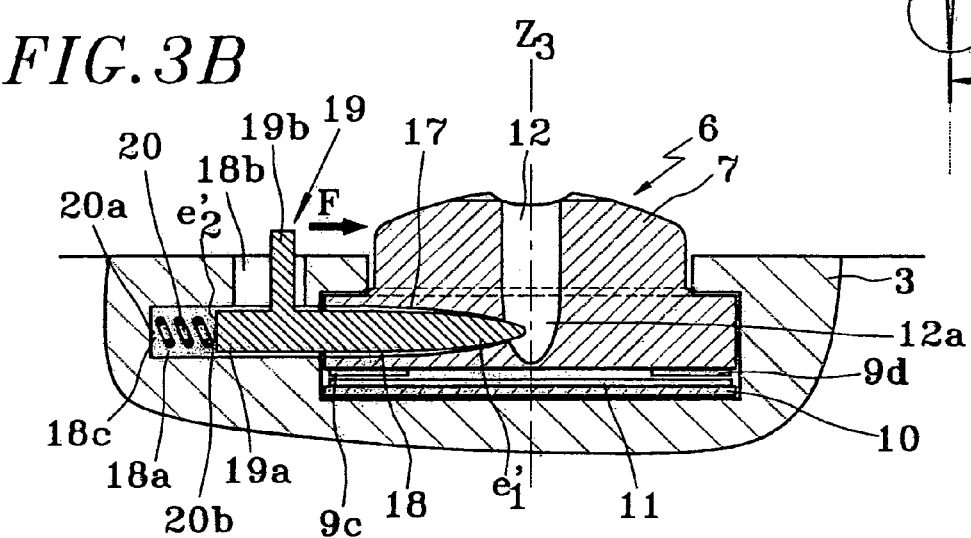
FIG. 3B is a view in section taken along the line IV—IV in FIG. 4A of the control means adapted to cooperate with the stylus from FIG. 3A.
Figure 3C:
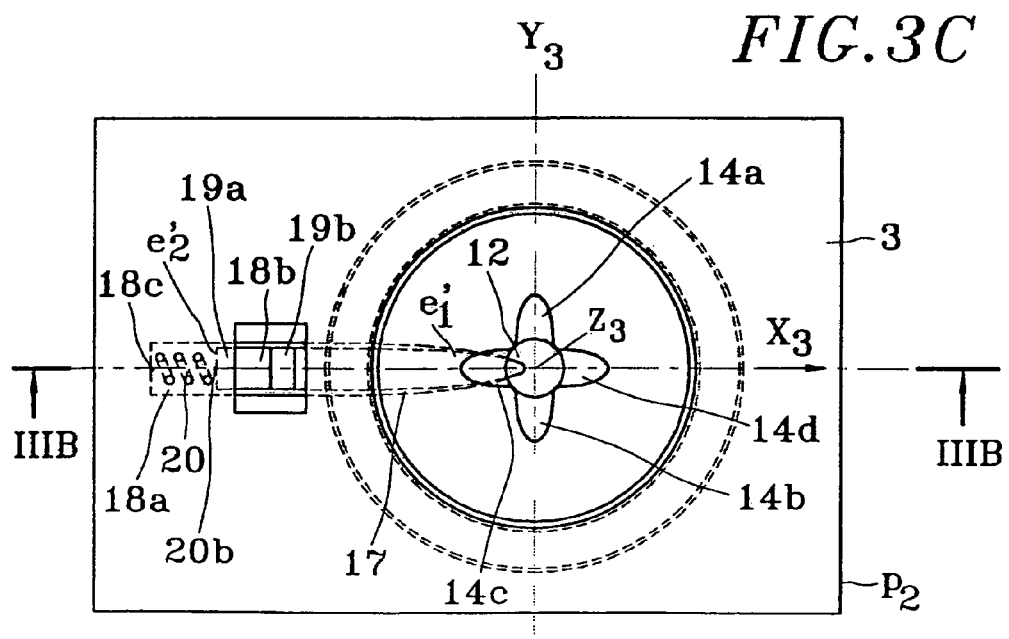
FIG. 3C is a plan view of the control means from FIG. 3B.

Referring to FIGS. 3B and 3C, the mobile part 7 of the cross 6 has in its central portion a cavity 12 adapted to receive the end 1"a of the stylus 1". In the example shown, the cavity 12 is a circular cylinder concentric with an axis Z3 and has a substantially rounded bottom 12a.

A recess 17 in the lower portion of the mobile part 7 opens into the lower portion of the cavity 12 and is adapted to line up with the notch 1"b of the stylus 1" once the end 1"a of the latter has been pressed in the cavity 12.

The recess 17 opens into a cavity 18 in the housing 3.

The recess 17 and the cavity 18 together form a housing for a member 19 for fastening the stylus 1" into the cavity 12 and releasing it therefrom.

To be more precise, the member 19 comprises an elongate main body 19a which occupies a portion 18a of the cavity 18 and the recess 17, extending along an axis X3 contained in a plane P3 of the housing 3 and perpendicular to the axis Z3. In the example shown, there is at the top of the body 19a an elongate projection 19b which lies in a portion 18b of the cavity 18, extends along the axis Z2, and projects out of the housing 3. The projection 19b therefore forms a touch-sensitive member that may be manipulated by a user.

The body 19a has a rounded first end e'1 that is oriented in the direction of the cavity 12 and a straight opposite second end e'2 that is spring-loaded by means of a coil spring 20, for example, having one end 20a fixed to a wall 18c of the cavity 18 and one end 20b fixed to the end e'2 of the body 19a, said spring lying in the portion 18a of the cavity 18 and extending along the axis X3. In a rest position, shown in FIGS. 3B and 3C, the end e'1 of the body 19a is engaged in the cavity 12.

The stylus 1" is fastened to the cross 6 by pressing the end 1"a of the stylus 1" into the cavity 12, with the end 1"a oriented in the cavity 12 so that the notch 1"b lines up with the orifice at which the recess 17 opens into the cavity 12. The end 1"a is pushed in until it abuts against the bottom 12a of the cavity 12, at which time said notch 1"b lines up exactly with said orifice.

The user then pushes the touch-sensitive member 19b in the direction of the arrow F in FIG. 3B, which moves the member 19, the end e'1 of the body 19a entering the cavity 12 and being accommodated in the notch 1"b. This fastens the stylus 1" to the mobile part 7 of the cross 6. Consequently, it may be manipulated in the manner of a joystick. To this end, in the same way as in the example represented in FIGS. 1B, 1C and 2B, 2C, the end of the cavity 12 that opens to the outside is provided with four notches 14a, 14b, 14c and 14d.

To release the stylus 1" from the cross 6, it suffices to push the touch-sensitive member 12b in the direction opposite to that of the arrow F, which compresses the spring 20. This releases the end e'1 of the body 19a from the cavity 12 so that user, continuing to hold the touch-sensitive member 19b, may remove the stylus 1". Once the stylus 1" has been removed completely, the user releases the touch-sensitive member 19b, which returns to its rest position shown in FIGS. 3B and 3C.

In a variant of the computer shown in FIG. 4B, the stylus 1" is not fastened to the multidirectional cross 6 but to the anchor member 6'.

Figure 3D:
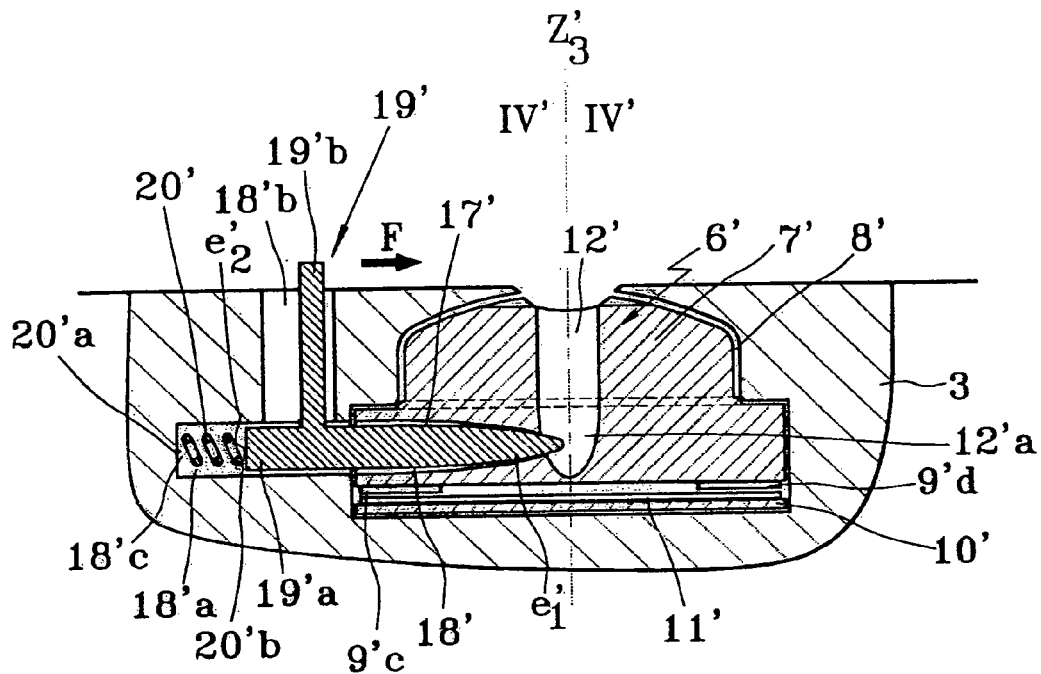
FIG. 3D is a view in section taken along the line IV'—IV' in FIG. 4B of a variant of the third embodiment of the control means.
Figure 3E:
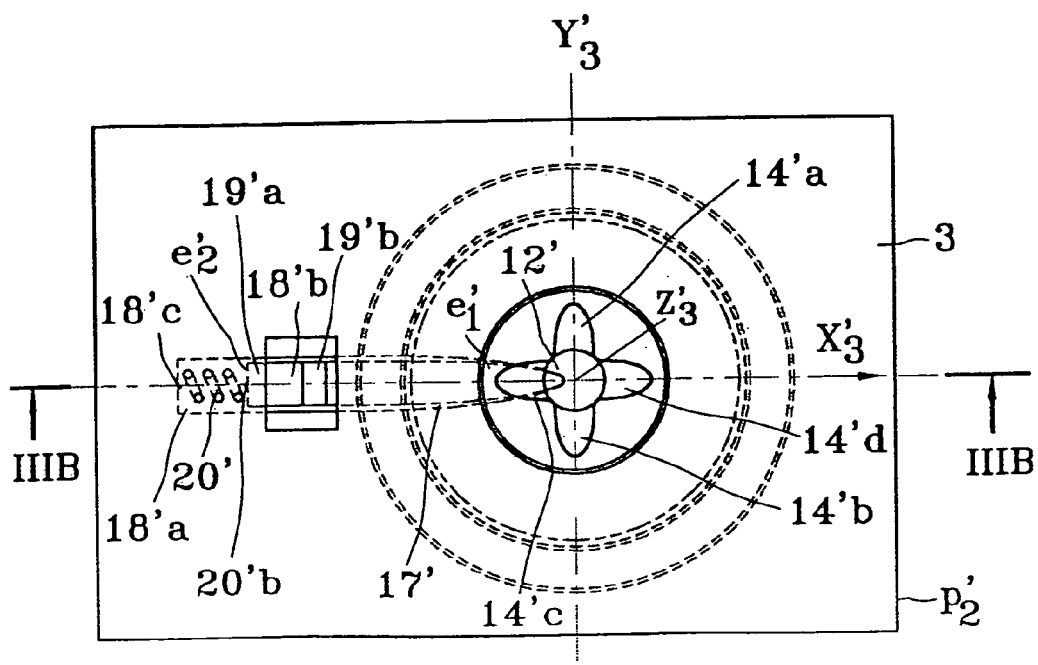
FIG. 3E is a plan view of the FIG. 3D variant of the control means.

Referring more particularly to FIGS. 3D and 3E, the member 6' differs from those shown in FIGS. 1D, 1E and 2D, 2E in that, in stead of the latter's notch, a recess 17' is formed in the lower portion of the mobile part 7', opens into the lower portion of the cavity 12', and is adapted to line up with the notch 1"b on the stylus 1" when the end 1"a of the latter is pushed into the cavity 12'.

The recess 17' opens into a cavity 18' in the housing 3.

The recess 17' and the cavity 18' together form a housing for a member 19' for fastening the stylus 1" into the cavity 12' and releasing it therefrom.

The recess 17', the cavities 12' and 18', and the member 19' being identical in all respects to the recess 17, the cavities 12, 18, and member 19, there is no need to describe them again.

Consequently, in the variant represented in FIGS. 3D and 3E, the stylus 1" is fastened and released in the same manner as in the third embodiment represented in FIGS. 3B and 3C.

The invention claimed is:

1. An apparatus comprising:
   a computer (2) including a housing (3) that carries a screen (4) and control means (6; 6') adapted to be manipulated by a user to generate movements of a mobile object on the screen in at least one direction, said control means comprising a fixed part (10; 10') and a mobile part (7; 7') fastened to the housing and cooperating with each other, said fixed part being electrically connected to the housing and said mobile part comprising movement transducer means (9a, 9b, 9c, 9d, 9'a, 9'b, 9'c, 9'd) which are adapted, in response to movement of the mobile part, to transmit to the fixed part information in the form of electrical signals relating to movement of said mobile object; and
   a stylus (1; 1'; 1") having an end (1a'1a; 1"a) that comprises fixing means (1b, 1'b, 1"b) adapted to cooperate with complementary fixing means (13; 13'; 13.sub.1; 17, 18, 19; 17', 18', 19') fastened to said mobile part to fasten the stylus to said mobile part to form a control that may be manipulated by the user.

2. A stylus according to claim 1, wherein the fixing means comprise a pin (1b; 1'b) attached to the end of the device.

3. A stylus according to claim 2, wherein said pin is fixed.

4. A stylus according to claim 2, wherein said pin is retractable.

5. A stylus according to claim 1, wherein the fixing means comprise a notch (1"b) formed in the end of the device.

6. A computer comprising:
   a housing (3) including a screen (4); and
   control means (6; 6') adapted to be manipulated by a user to generate movements of a mobile object on the screen in at least one direction, said control means comprising a fixed part (10; 10') and a mobile part (7; 7') fastened to the housing and cooperating with each other, said fixed part being electrically connected to the housing and said mobile part comprising movement transducer means (9a, 9b, 9c, 9d, 9'a, 9'b, 9'c, 9'd) which are adapted, in response to movement of the mobile part, to transmit to the fixed part information in the form of electrical signals relating to movement of said mobile object,
   wherein said mobile part (7; 7") comprises fixing means complementary to fixing means (1b, 1'b, 1"b) disposed at the end (1a; 1'a; 1"a) of a stylus (1; 1'; 1") adapted to be moved over the screen (4) to fasten the stylus to said mobile part to form a control that may be manipulated by the user.

7. A computer according to claim 6, wherein the complementary fixing means comprise a notch (13'13'; 13.sub.1; 13'.sub.1) opening into a cavity (12; 12') in the mobile part (7; 7') and adapted to receive the end (1a; 1'a) of the stylus (1; 1').

8. A computer according to claim 6, wherein the complementary fixing means comprise a fastening member (19; 19') for fastening the stylus (1") into and releasing it from a cavity (12; 12') in the mobile part (7; 7') adapted to receive the end (1"a) of the stylus (1"), said fastening member being disposed in a housing that is defined firstly by a recess (17; 17') in the mobile part (7; 7') that opens into said cavity (12; 12') and secondly by a cavity (18; 18') in the housing (3), said cavity (18; 18') having a first portion (18a; 18'a) that opens into the recess (17; 17') and a second portion (18b; 18'b) that opens to the outside of the housing (3).

9. A computer according to claim 6, wherein the control means comprise a multidirectional cross (6).

10. A computer according to claim 6, wherein the control means comprise an anchor member (6').

11. A computer according to claim 7, wherein the control means comprise a multidirectional cross (6).

12. A computer according to claim 8, wherein the control means comprise a multidirectional cross (6).

13. A computer according to claim 7, wherein the control means comprise an anchor member (6').

14. A computer according to claim 8, wherein the control means comprise an anchor member (6').

15. A computer according to claim 6, wherein said movement transducer means responds to pivoting motion of the stylus which is manipulated by the user as a joystick while being fastened to said mobile part.

16. An apparatus according to claim 1, wherein said movement transducer means responds to pivoting motion of the stylus which is manipulated by the user as a joystick while being fastened to said mobile part.

* * * * *

UNITED STATES PATENT AND TRADEMARK OFFICE
CERTIFICATE OF CORRECTION

PATENT NO. : 7,221,360 B2  Page 1 of 1
APPLICATION NO. : 10/495588
DATED : May 22, 2007
INVENTOR(S) : Christine Defuans et al.

It is certified that error appears in the above-identified patent and that said Letters Patent is hereby corrected as shown below:

In col. 4, line 18, please delete "joys tick" and substitute therefore --joystick--.

In col. 5, line 7, please delete "joys tick" and substitute therefore --joystick--.

In col. 5, lines 64-65, please delete "joys tick" and substitute therefore --joystick--.

In col. 7, line 13, please delete "joys tick" and substitute therefore --joystick--.

Claim 15, col. 8, line 60, please delete "joys tick" and substitute therefore --joystick--.

Claim 16, col. 8, line 64, please delete "joys tick" and substitute therefore --joystick--.

Signed and Sealed this

Twenty-second Day of September, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,221,360 B2 | Page 1 of 1 |
| APPLICATION NO. | : 10/495588 | |
| DATED | : May 22, 2007 | |
| INVENTOR(S) | : Christine Defuans et al. | |

It is certified that error appears in the above-identified patent and that said Letters Patent is hereby corrected as shown below:

Claim 2, col. 8, line 3, please delete "A stylus" and substitute therefore --An apparatus--.

Claim 3, col. 8, line 5, please delete "A stylus" and substitute therefore --An apparatus--.

Claim 4, col. 8, line 6, please delete "A stylus" and substitute therefore --An apparatus--.

Claim 5, col. 8, line 8, please delete "A stylus" and substitute therefore --An apparatus--.

Signed and Sealed this
Twenty-third Day of August, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,221,360 B2 | Page 1 of 1 |
| APPLICATION NO. | : 10/495588 | |
| DATED | : May 22, 2007 | |
| INVENTOR(S) | : Christine Defuans et al. | |

It is certified that error appears in the above-identified patent and that said Letters Patent is hereby corrected as shown below:

Claim 2, col. 8, line 3, please delete "A stylus" and substitute therefore --An apparatus--.

Claim 3, col. 8, line 5, please delete "A stylus" and substitute therefore --An apparatus--.

Claim 4, col. 8, line 6, please delete "A stylus" and substitute therefore --An apparatus--.

Claim 5, col. 8, line 8, please delete "A stylus" and substitute therefore --An apparatus--.

Signed and Sealed this

Thirteenth Day of September, 2011

David J. Kappos
*Director of the United States Patent and Trademark Office*